United States Patent [19]

Widrow

[11] Patent Number: 4,858,130
[45] Date of Patent: Aug. 15, 1989

[54] ESTIMATION OF HYDRAULIC FRACTURE GEOMETRY FROM PUMPING PRESSURE MEASUREMENTS

[75] Inventor: Bernard Widrow, Santa Clara County, Calif.

[73] Assignee: The Board of Trustees of the Leland Stanford Junior University, Stanford, Calif.

[21] Appl. No.: 83,041

[22] Filed: Aug. 10, 1987

[51] Int. Cl.⁴ .................... G01V 1/02; G01V 1/40; E21B 47/00
[52] U.S. Cl. .................... 364/421; 73/151; 166/250
[58] Field of Search .......... 364/421, 422; 367/14, 367/25; 73/151; 166/250

[56] References Cited

U.S. PATENT DOCUMENTS

| | | | |
|---|---|---|---|
| 4,432,078 | 2/1984 | Silverman | 367/37 |
| 4,587,641 | 5/1986 | DiFoggio | 367/30 |
| 4,641,724 | 2/1987 | Chow et al. | 181/104 |

Primary Examiner—Clark A. Jablon
Attorney, Agent, or Firm—Flehr, Hohbach, Test, Albritton & Herbert

[57] ABSTRACT

A pump is coupled through a discharge line to a wellbore, which in turn intersects a fracture, the wellbore and fracture being filled with fluid to form a fluid system. Sensors are located in position at the top and, under certain circumstances, at the bottom of the wellbore. The dimensions of the fracture are calculated from data generated by the sensors by analyzing the incident and reflected waves within the fluid system the acoustic waves being generated by pressure pulses from a pump and travel from the pump through the fluid into the fracture. In preferred embodiments of this invention, transfer functions are developed by analysis of the data, so that the data recorded by sensors at the top of the wellbore accurately represent pressure fluctuations at the bottom of the wellbore. Transfer functions relating pressure fluctuations at the top of the wellbore to pressure fluctuations at the bottom of the wellbore, i.e., at the mouth of the fracture, exhibit resonant phenomena in the fracture from which fracture length can be determined. A Fourier transform is generated of transfer functions relating the impulse at the top of the annulus to the impulse response at the fracture entrance and through the fracture, to provide a time domain analysis of the waves in the fracture. This way, travel times of waves in the fracture can be determined, and this data used to estimate the length and height of the fracture, given that the wave speed in the fracture is known.

20 Claims, 11 Drawing Sheets

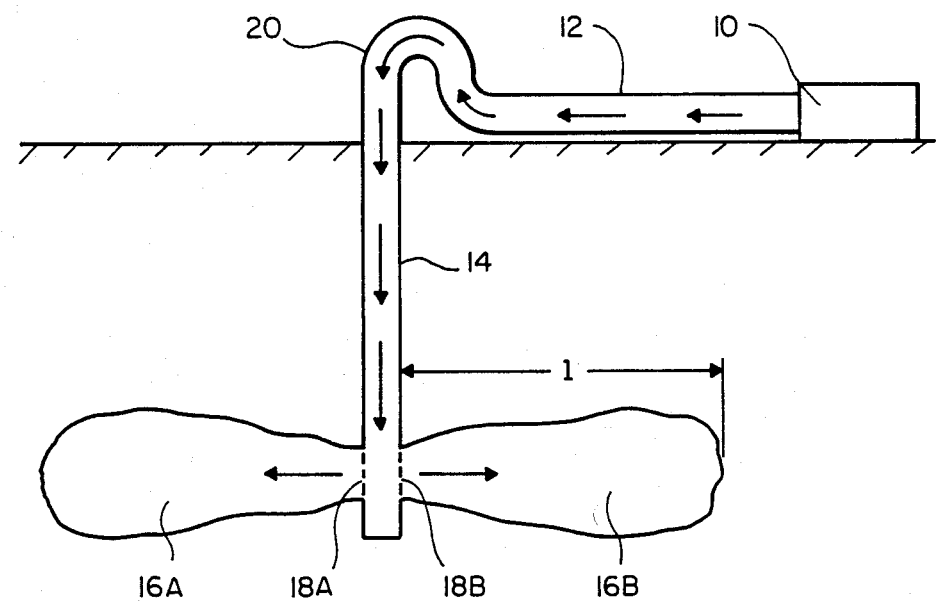
*FIG_1*
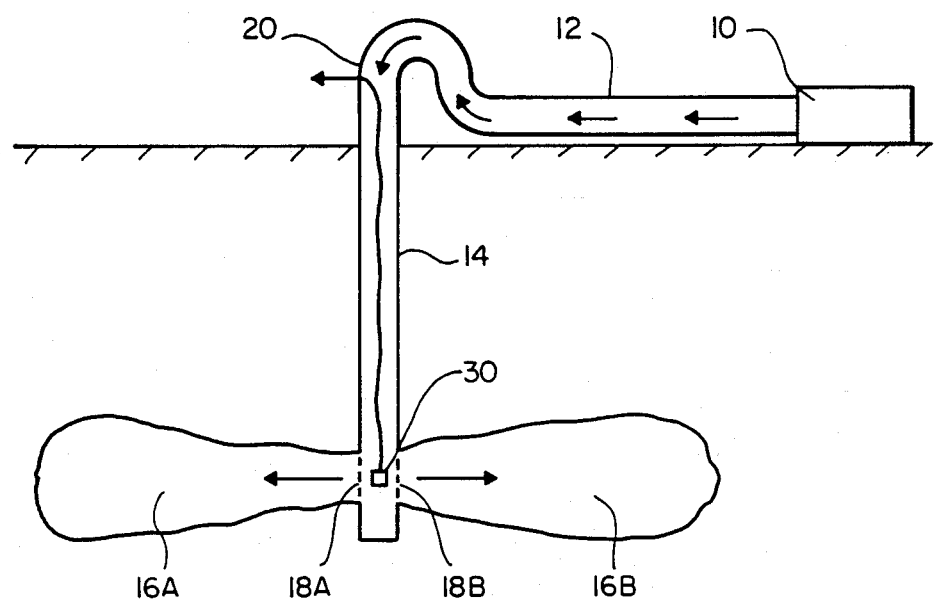
*FIG_2*

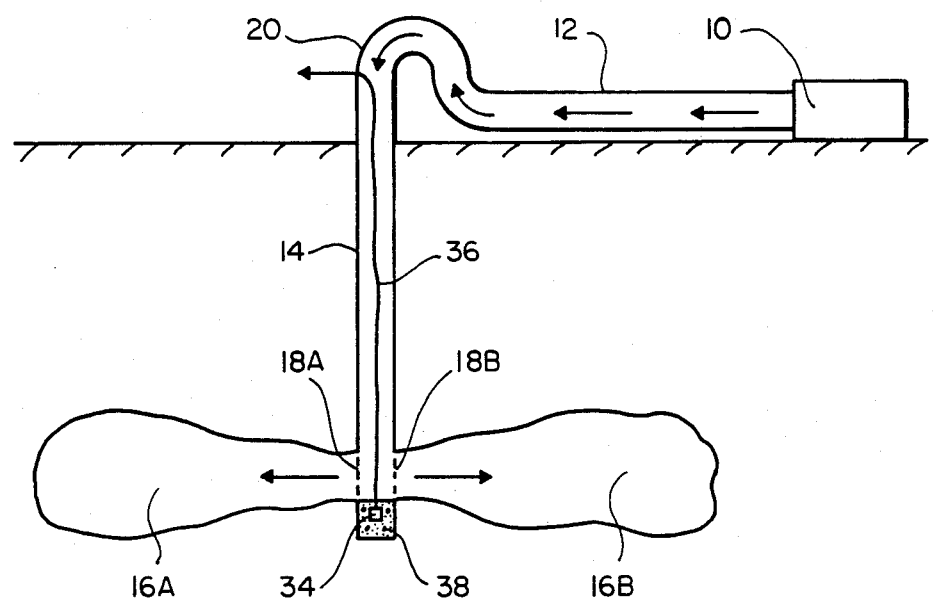
FIG_3
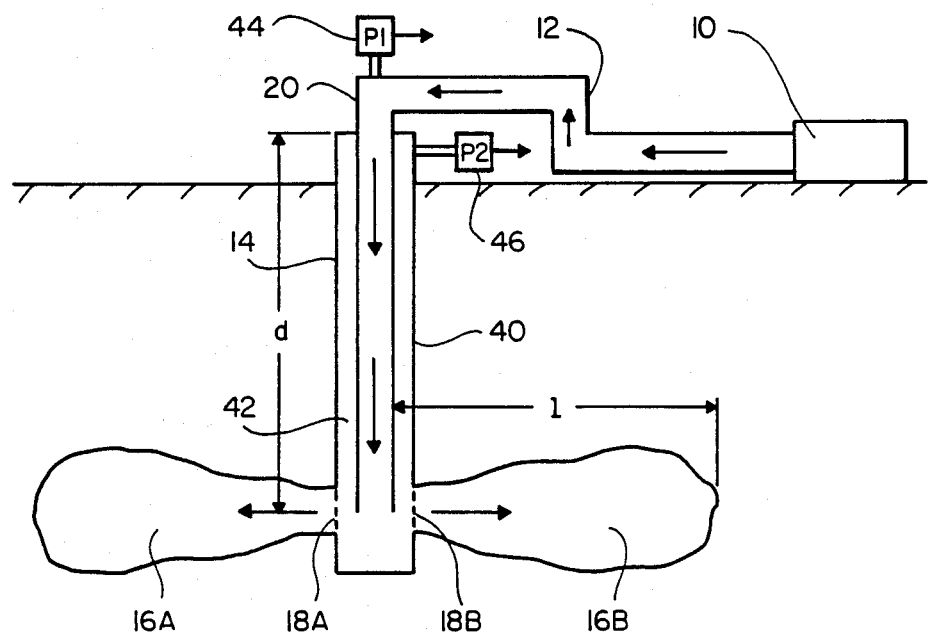
FIG_4

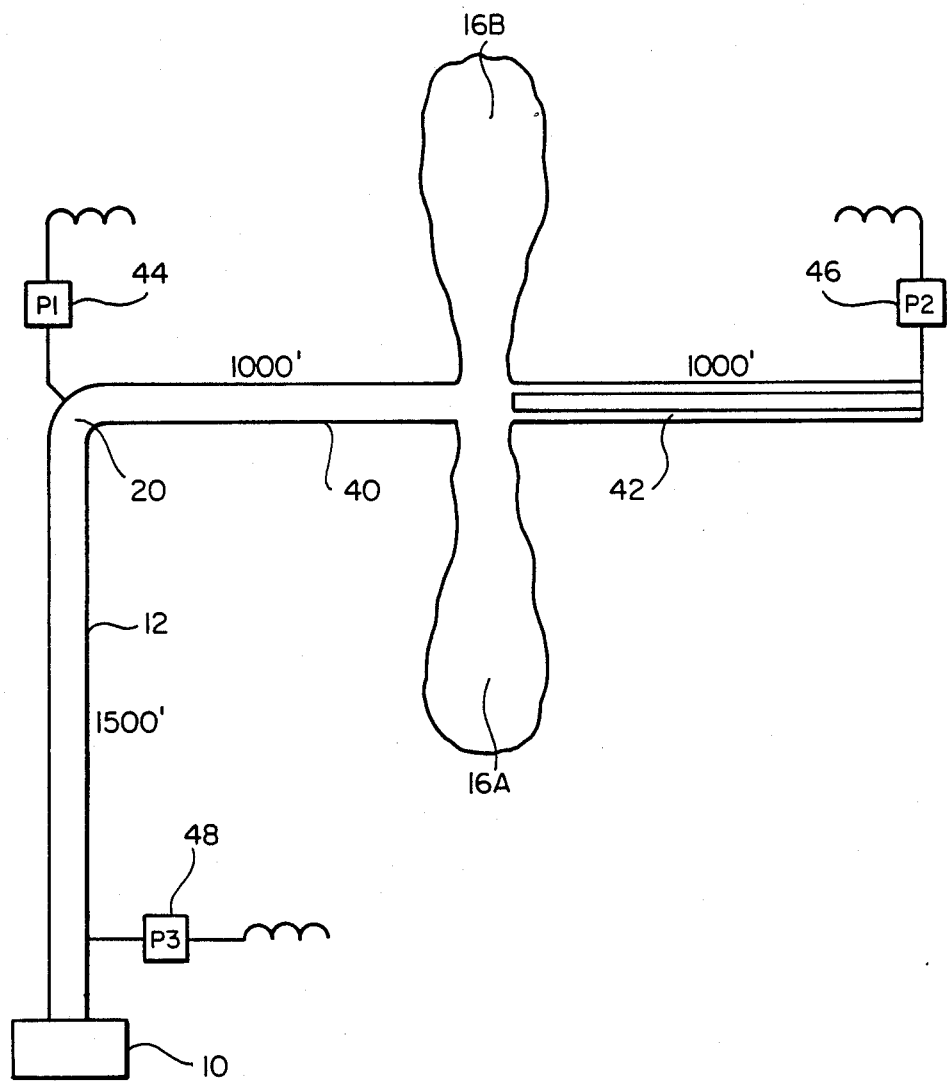
FIG_5

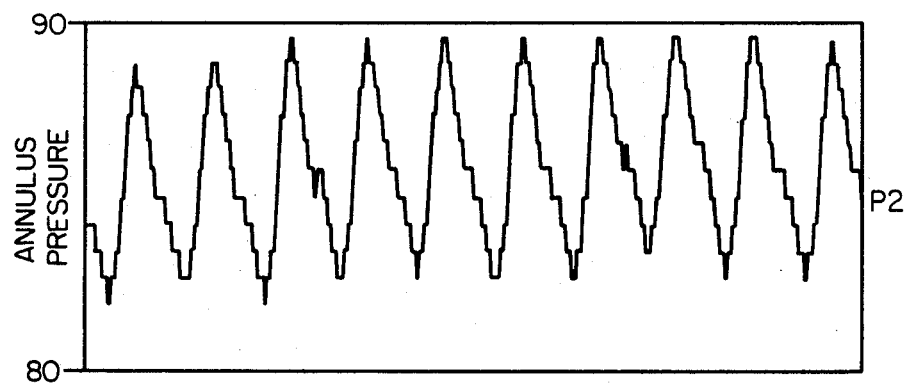
FIG_6A
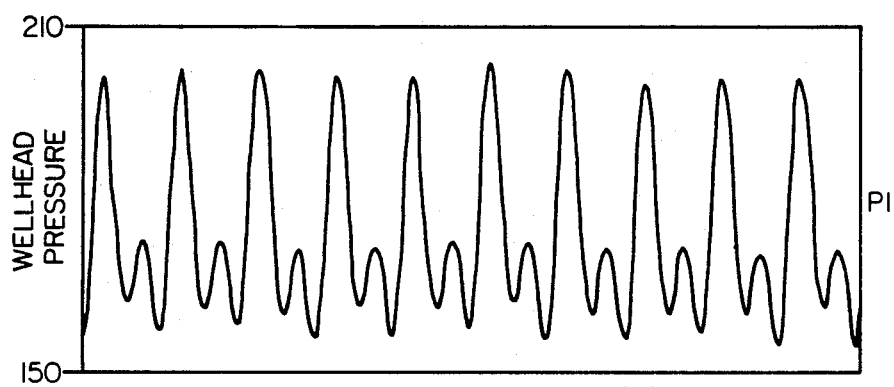
FIG_6B
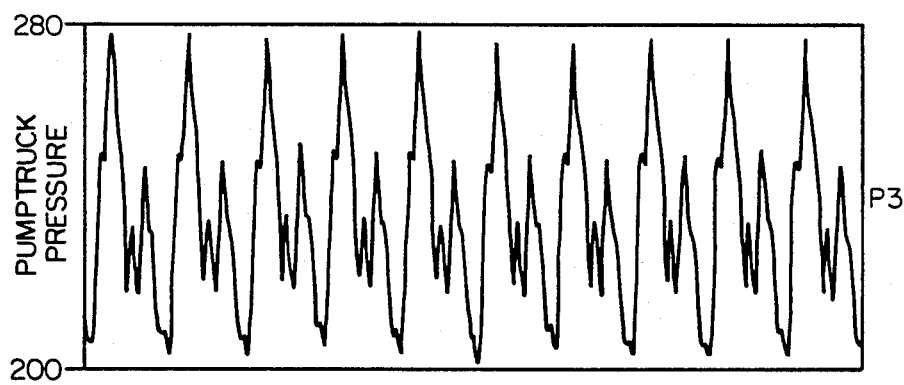
FIG_6C

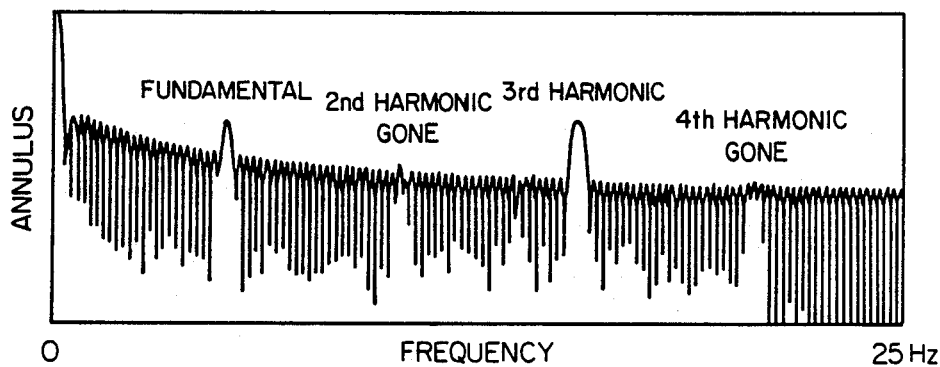
FIG_7A
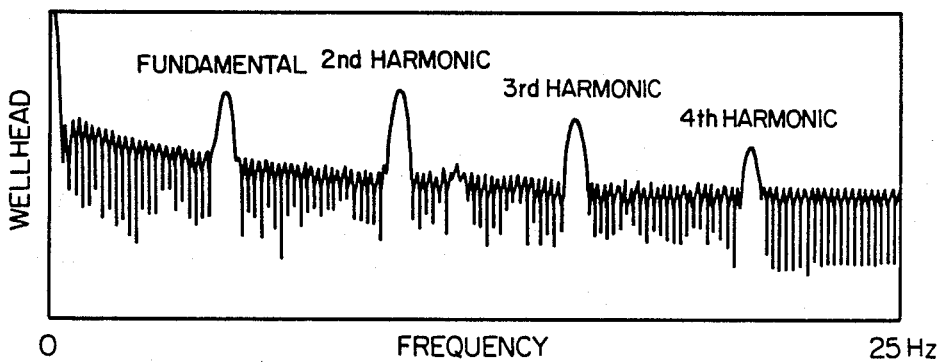
FIG_7B
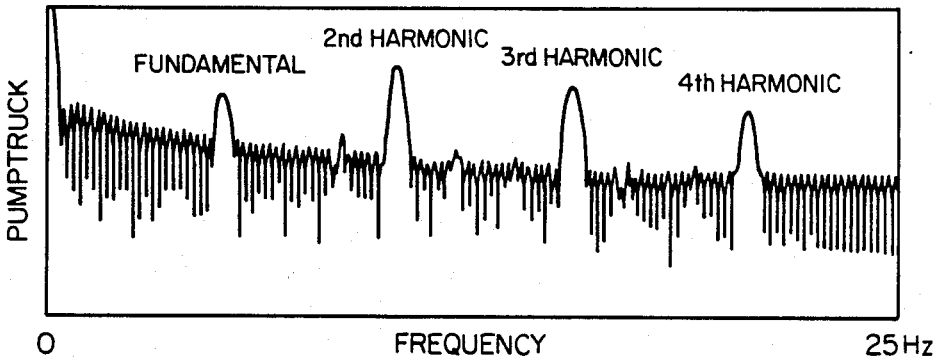
FIG_7C

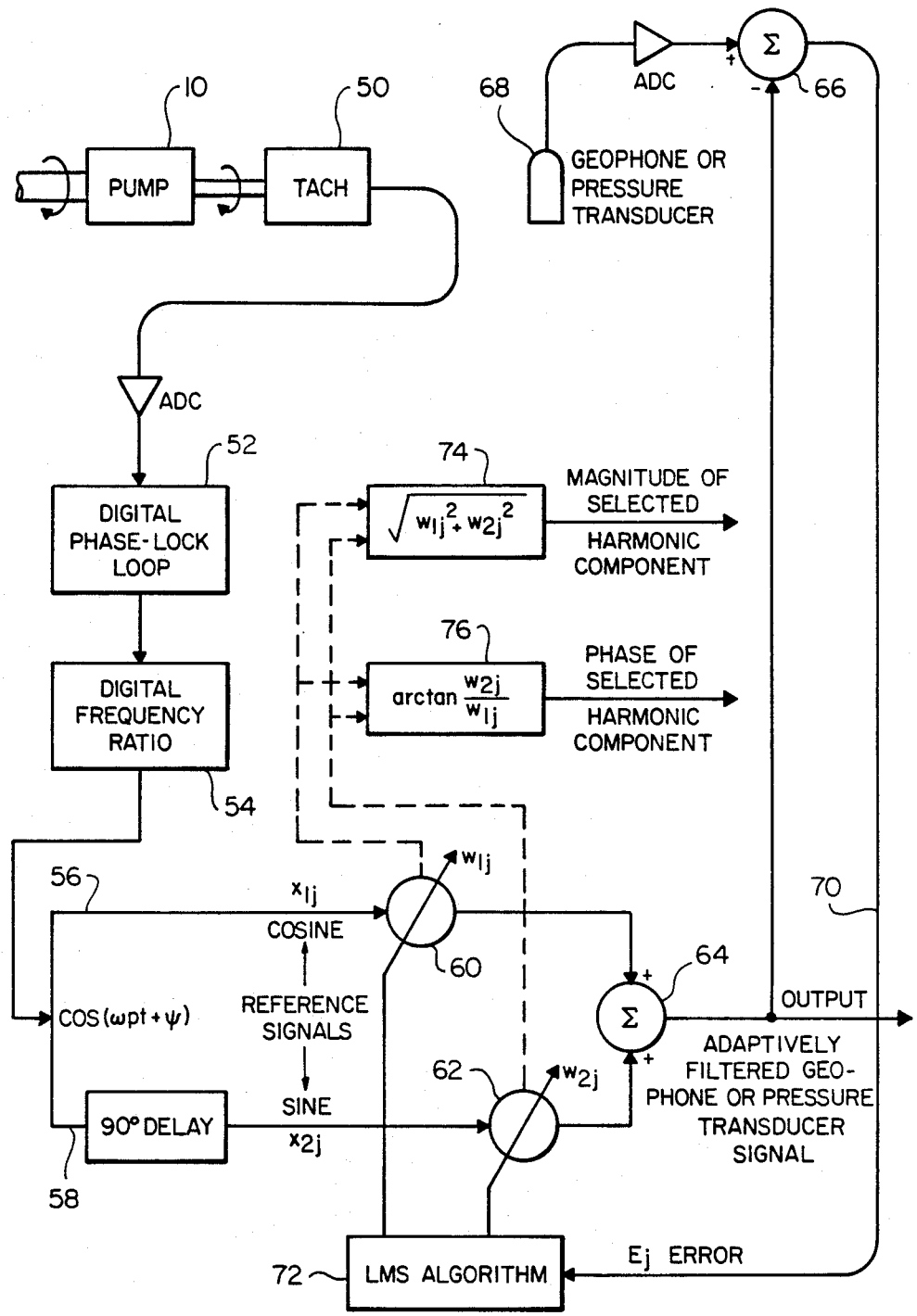
FIG_8

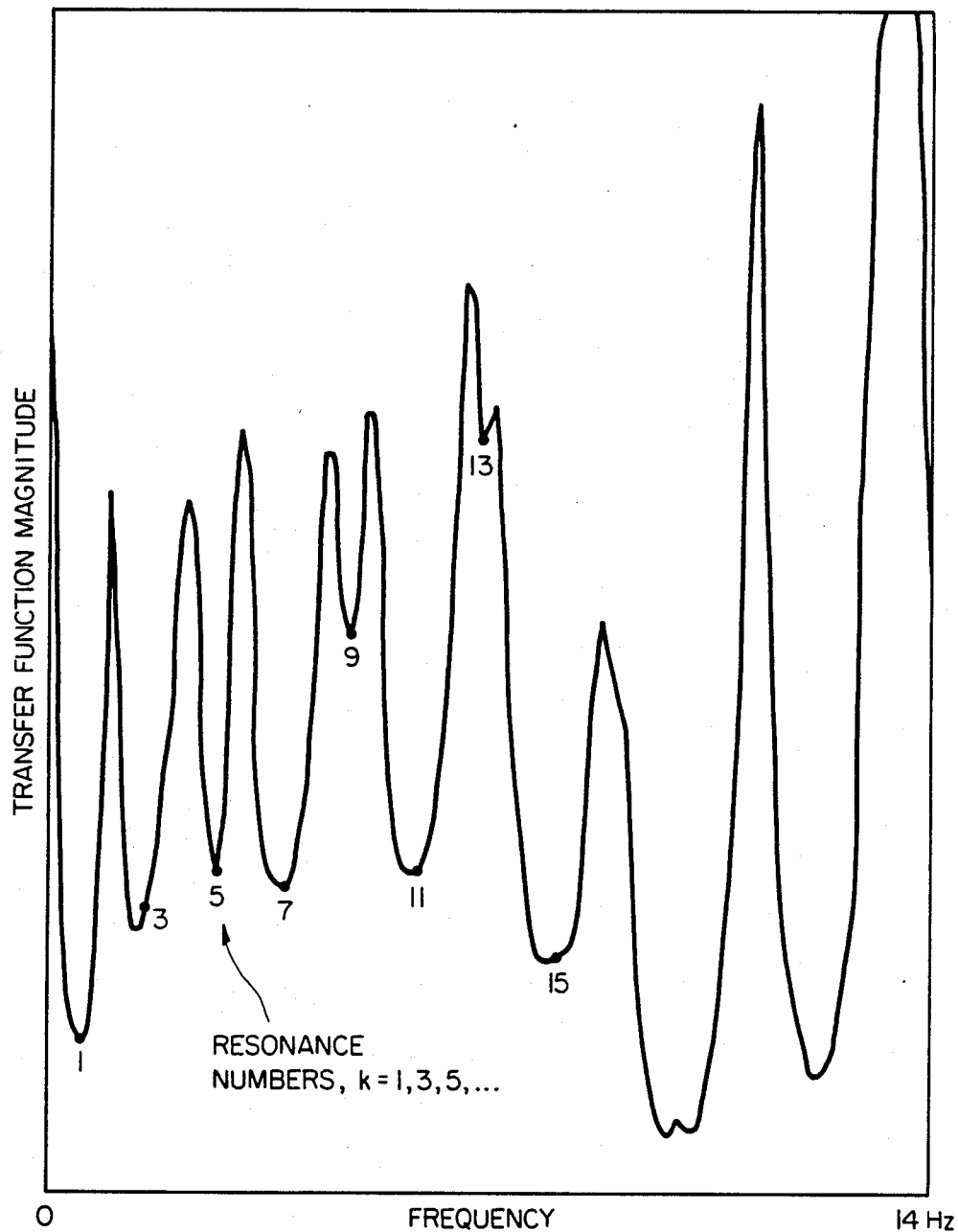
FIG_9

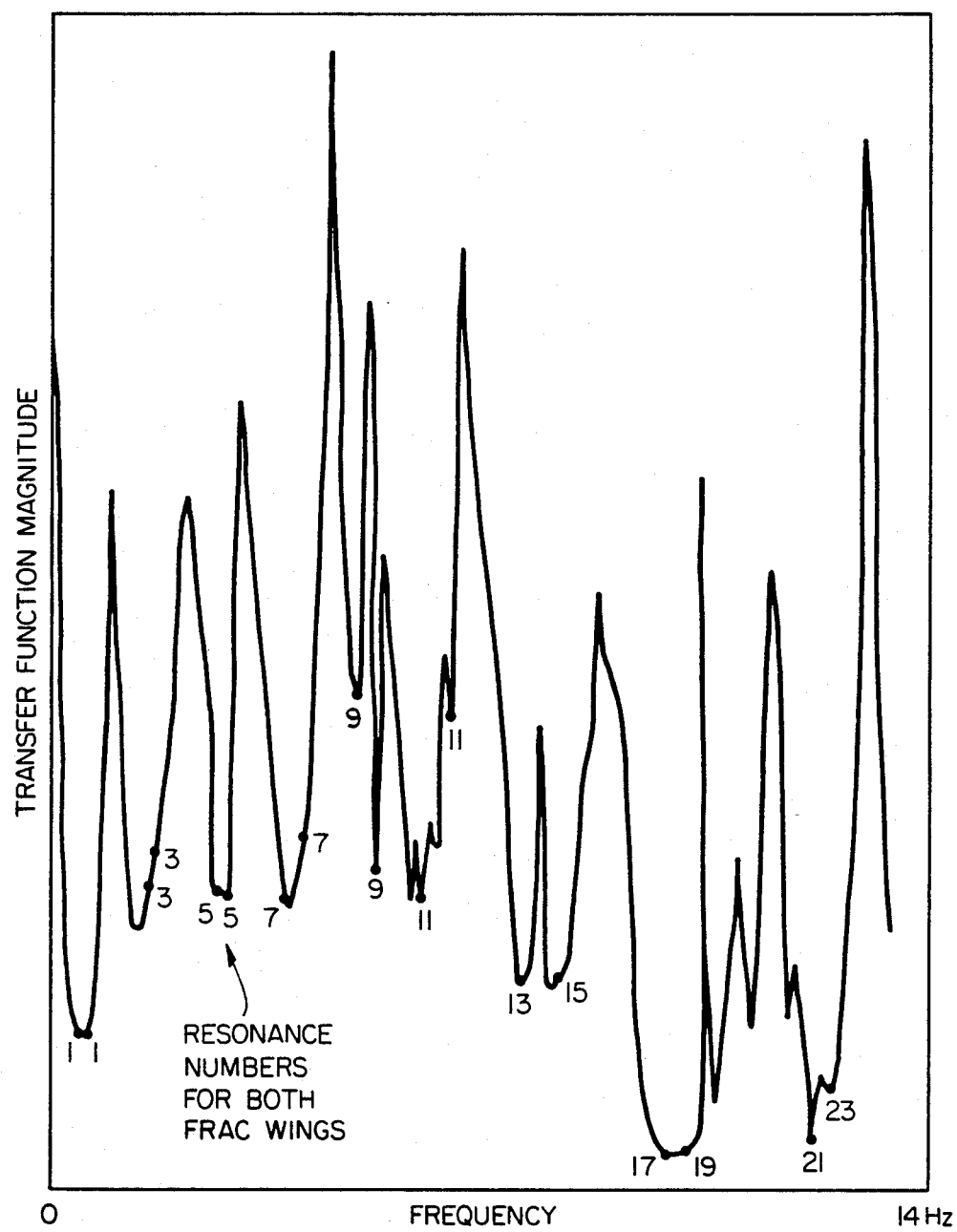
FIG_10

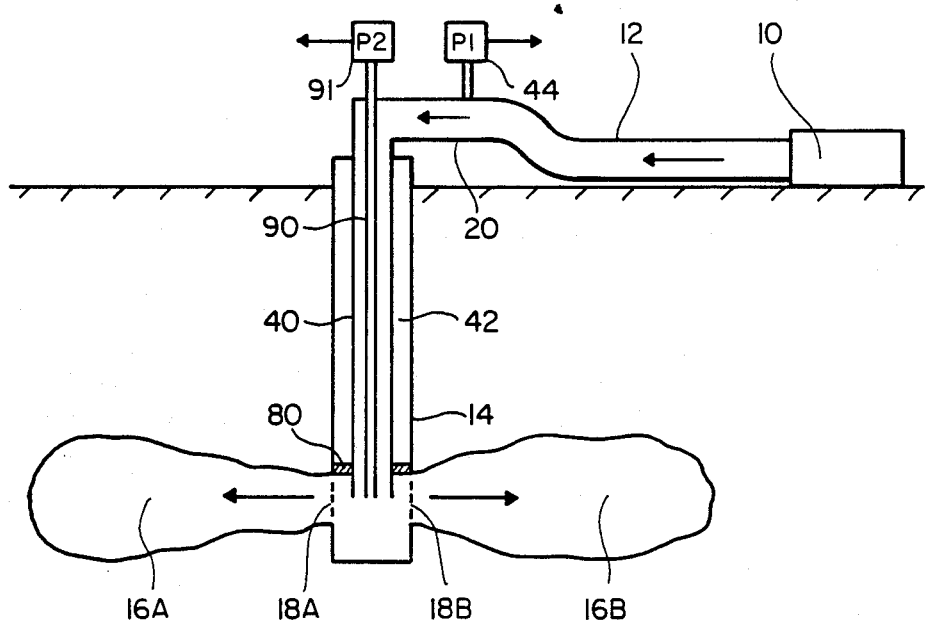
FIG_11A
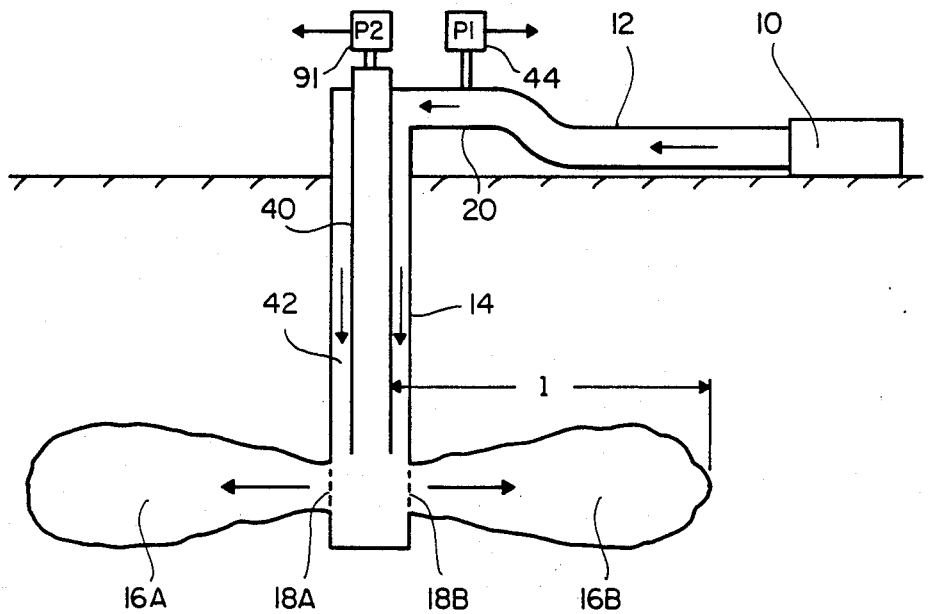
FIG_11B

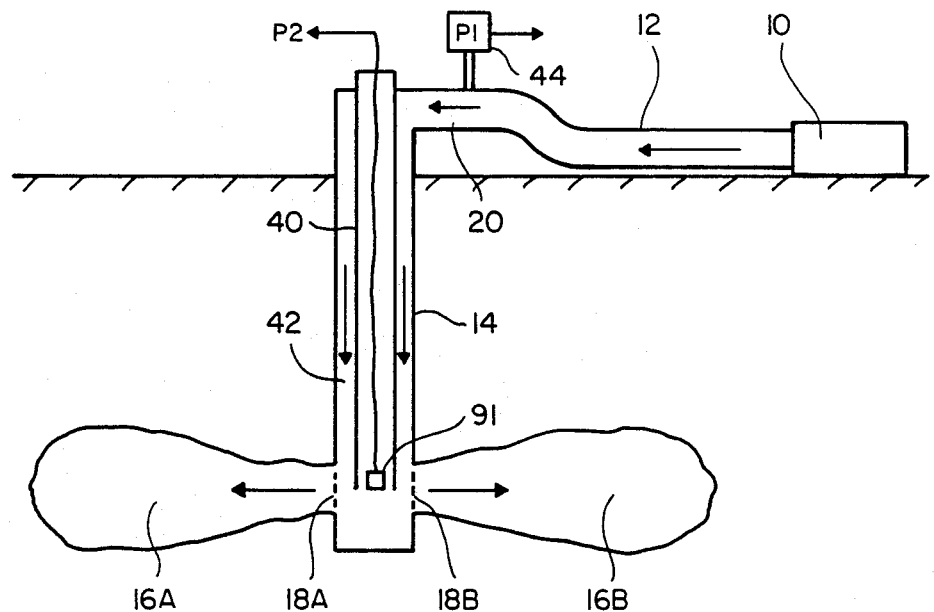
FIG_11C
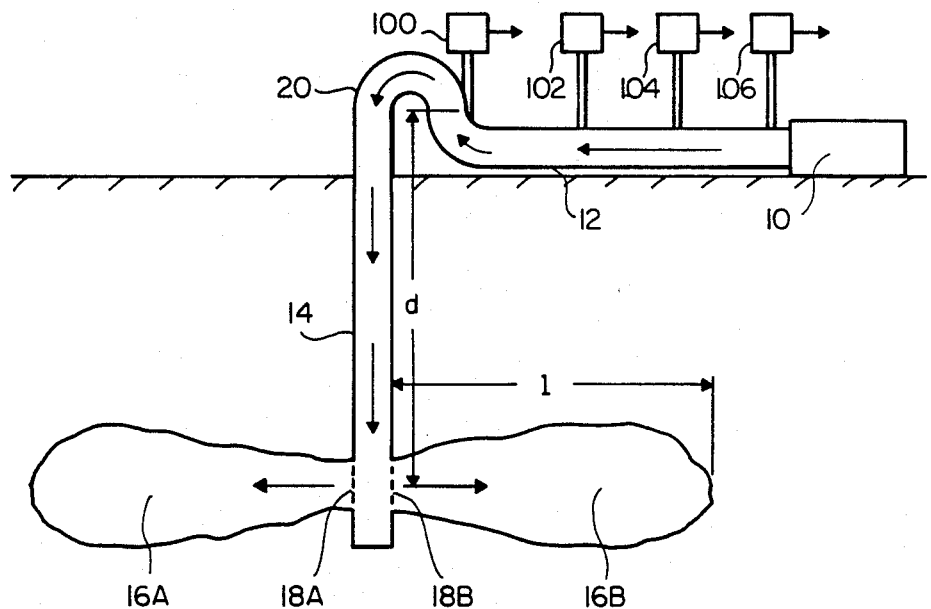
FIG_12

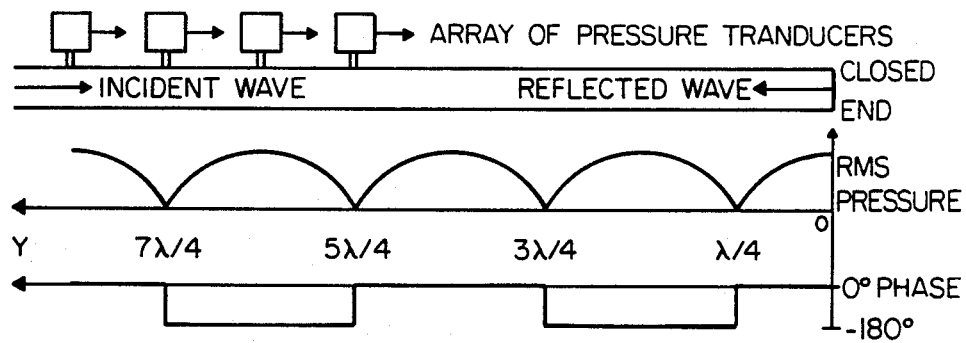
FIG_13A
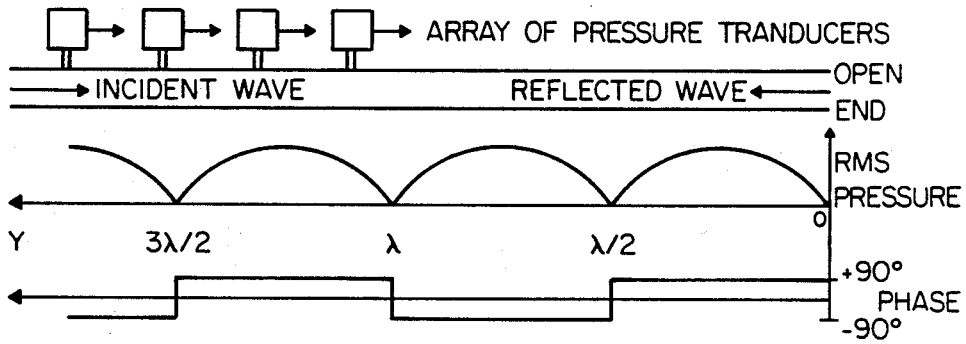
FIG_13B
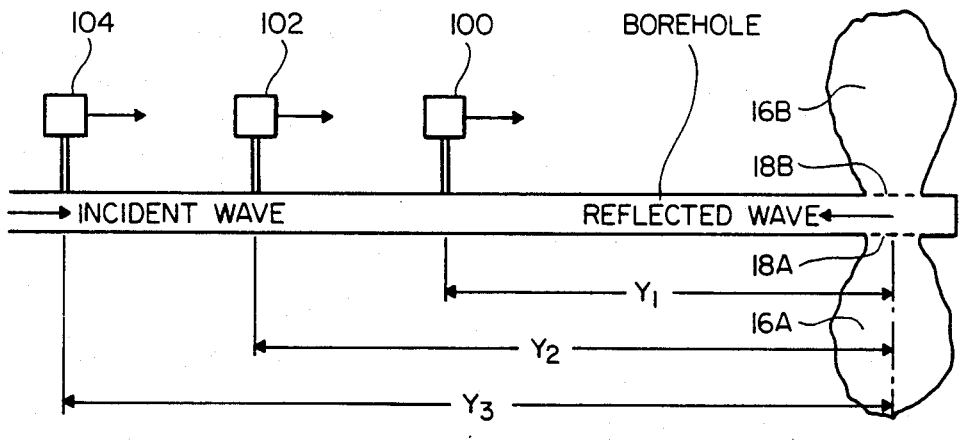
FIG_14

ESTIMATION OF HYDRAULIC FRACTURE GEOMETRY FROM PUMPING PRESSURE MEASUREMENTS

BACKGROUND OF THE INVENTION

This invention is directed generally to the field of determination of subsurface earth structure, and more particularly to determining the geometry and orientation of hydraulic fractures in the earth.

A significant portion of the world's oil and gas resource is contained in reservoir rocks that have high porosity but low permeability. These rocks are called "tight sands." An important technique for producing oil or gas from tight sands is hydraulic fracturing. Under high pressure, a fluid is pumped down the borehole, through the perforations at a selected depth, out into the reservoir rock. Generally, a vertical fracture is created in this rock on both sides of the borehole. The fracturing fluid would often be mixed with a proppant such as sand, to keep the fracture propped open after pumping is stopped. The large area of the fracture permits flow of oil or gas at commercial rates from the reservoir through the fracture and into the well.

In developing a tight-sand reservoir, it is usual that many holes are drilled. If each hole is drilled, completed and the fracture established, a great deal of cost is involved. Siting and spacing of these holes is critical to the economic recovery of oil and gas resources. In order to make optimum hole siting decisions, one must have knowledge of the azimuth of the fracture and of its geometry, such as length and height. Therefore, a need exists for an accurate method of estimating fracture length and fracture geometry from field measurements.

SUMMARY OF THE INVENTION

Therefore, a principal objective of this invention is to develop a method to estimate hydraulic fracture geometry.

More particularly, it is an objective of this invention to estimate fracture geometry from analysis of pumping pressure measurements.

Another objective of this invention is to provide an analysis of hydraulic fracture geometry by controllably modifying the operating speed of a pump coupled through a wellbore to a fracture, and measuring the resonances that occur in the waves which propagate through the wellbore and fracture.

Yet another objective is to provide specific means and methods of analysis of data generated by variable speed pumping of fluid and proppant into fractures by the use of transfer function analysis.

Yet another objective is to provide a time domain analysis of the waves in the fracture by Fourier transforming the transfer function to get the impulse response, from which travel times of waves in the fracture can be determined an used to estimate the length of the fracture given that wave speed in the fracture is known.

Briefly, this invention is implemented by coupling a pump through a discharge line to the wellbore which in turn intersects a fracture, the wellbore and fracture being filled with fluid to form a fluid system. Sensors are located in position at the top and under certain circumstances at the bottom of the wellbore. The dimensions of the fracture are calculated from data generated by the sensors by analyzing the incident and reflected waves within the fluid system.

In preferred embodiments of this invention, transfer functions are developed by analysis of the data, so that the data recorded by sensors at the top of the wellbore accurately represent pressure fluctuations at the bottom of the wellbore. Transfer functions relating pressure fluctuations at the top of the wellbore to pressure fluctuations at the bottom of the wellbore, i.e., at the mouth of the fracture, exhibit resonant phenomena in the fracture from which fracture length can be determined.

A Fourier transform is generated of transfer functions relating the impulse at the top of the annulus to the impulse response at the fracture entrance and through the fracture, to provide a time domain analysis of the waves in the fracture. In this way, travel times of waves in the fracture can be determined, and this data used to estimate the length and height of the fracture, given that the wave speed in the fracture is known.

BRIEF DESCRIPTION OF THE DRAWINGS

The features and advantages of this invention will be more readily apparent from the description of a preferred embodiment herein which is given with reference to the following drawings:

FIG. 1 is a cross section of basic elements of a hydraulic system useful in explaining this invention;

FIGS. 2, 3 and 4 illustrate alternative modes of mounting sensors in a wellbore connected to a fracture, and pumping fluid down a wellbore to determine node and antinode frequencies;

FIG. 5 is a schematic of FIG. 4 provided for purposes of theoretical analysis;

FIGS. 6A, 6B, 6C, 7A, 7B and 7C illustrate data taken from the system of FIGS. 4–5; FIGS. 6A, 6B and 6C are the raw data, and FIGS. 7A, 7B and 7C are a 256 point Fourier transform of the pump truck, wellhead and annulus pressure data;

FIG. 8 is a block diagram of a signal processing technique used to filter data;

FIGS. 9 and 10 illustrate development of a wellhead to annulus transfer function.

FIG. 10 illustrates non-uniformly spaced nulls in a measured response.

FIGS. 11A, B and C illustrate alternative embodiments of approaches to coupling the pump to the wellbore and sensing resulting pressure pulsations.

FIGS. 12A, B, C and D illustrate the results of pumping a fracture using the embodiment of FIG. 11B to record the data, the different waveforms representing the impulse response at successive periods of time (10%, 15%, 50%, 90% complete) during the process.

DESCRIPTION OF A PREFERRED EMBODIMENT

The basic elements of a pumped hydraulic fracture system appear in FIG. 1. They include a pump 10 coupled through a discharge line 12 to a wellbore 14. The wellbore 14 extends at least down to an intersection with the wings 16a, 16b of a fracture 16. Openings or perforations 18a, 18b connect the wellbore with the fracture 16.

High pressure positive displacement piston pumps 10 are used to create hydraulic fractures 16. Each piston stroke causes a pressure pulse in the fluid stream at the pump outlet. These pulses appear as fluctuations about the large mean (static) pressure. They travel as acoustic waves in the fluid down the pump discharge line 12 to the wellhead 20, and from there down the wellbore 14, through the perforations 18, and out into the two wings 16A, B of the fracture 16, as shown in FIG. 1. These waves reflect from the well bottom and from the ends and other features of the fracture 16 so that incident and reflected waves are present simultaneously in all parts of the hydraulic system. The superposition of the waves results in standing waves everywhere in the system. Analysis of these waves using methods herein will provide significant data about the dimensions of the fracture.

Referring to FIG. 1, suppose that the length of one wing 16 of the fracture is 1, and that the velocity of propagation of an acoustic wave in the fracture is c. Assume that at a certain frequency $f_1$ the length of this wing is exactly ¼ of a wavelength. Let the wavelength be $\lambda_1$ at frequency $f_1$.

$$l = \tfrac{1}{4}\lambda_1 \tag{1}$$

The wavelength is related to frequency according to $$\lambda_1 = \frac{c}{f_1} \tag{2}$$

Therefore $$f_1 = c/4l \tag{3}$$

The fundamental resonant frequency of the fracture wing 16A of FIG. 1 is $f_1$, given by the above relation. In general, resonances occur at frequencies where the length 1 is equal to any odd multiple of a quarter wavelength. Accordingly, $$l = \frac{k\lambda}{4}, \quad k = 1,3,5,7,\ldots \tag{4}$$

$$\lambda = \frac{c}{f} \tag{5}$$

$$l = \frac{kc}{4f} \tag{6}$$

$$\therefore f = \frac{kc}{4l} \tag{7}$$

so that $$f_1 = \frac{c}{4l} \tag{8}$$

$$f_2 = \frac{3c}{4l}$$

$$f_3 = \frac{5c}{4l}$$

$$\vdots$$

These are the resonant frequencies of the wing 16A or B of the fracture 16, expressed in terms of the length 1 and the wave propagation velocity c.

Given knowledge of the wave velocity c and assuming one could detect one or several of the resonant frequencies $f_1$, $f_2$, $f_3$, ..., relations (8) can be used to determine the length 1 of the the wing 16 of the fracture 18. Methods for measuring these resonant frequencies to determine length are therefore important to this invention.

Treating the wing 16A or B of the fracture 16 simply as an organ pipe closed at its far end, the acoustic standing wave pattern will be such as to have a pressure maximum (antinode) at the closed end, and to have a pressure minimum (node) ¼ of a wavelength away. A pressure antinode will exist at any integer multiple of a half wave distance from the closed end, and a pressure node will exist at any odd multiple of a quarter wave distance from the closed end. Thus, at each of the resonant frequencies $f_1$, $f_2$, $f_3$ ... of Eq. (8), a pressure node will exist at the perforations 18A, B, at the mouth of the wing 16A, B of the fracture.

One way pressure node frequencies can be detected at the mouth of the fracture 16 is illustrated in FIG. 2. The mouth is the intersection 18 of the wellbore 14 and the fracture 16. A downhole pressure signal can be obtained from a wireline-supported electronic pressure sensor 30, preferably a high-frequency sensor. This can be analyzed to determine the amplitude of the fundamental pumping signal. The pumping rate can be gradually varied, and frequencies where this amplitude drops to zero or to relatively low values can be noted. These frequencies correspond to $f_1$, $f_2$, $f_3$ ... of Eq. (8). Knowledge of these nodal frequencies can therefore be used to estimate the length of the fracture wing 16A, B.

Pressure pulsation nulls at the mouth 18A, B defined by the perforations into the fracture 16 are caused by resonances in either of the two wings 16A, B of the fracture 16. If wings 16A, B are identical in geometry, their resonant frequencies will be identical. However, if irregularities in the earth cause asymmetries to develop in the fracture wings 16A, B, then the set of frequencies at which pressure nulls exist will be the union of the sets of null frequencies at which pressure nulls exist for both fracture wings. This set of frequencies is $$\begin{array}{lll} & f_{11} = c/4l_1 & f_{21} = c/4l_2 \\ \text{wing \#1} & f_{12} = 3c/4l_1 \quad \text{and} & f_{22} = 3c/4l_2 \quad \text{wing \#2,} \\ & f_{13} = 5c/5l_1 & f_{23} = 5c/4l_2 \\ & \vdots & \vdots \end{array} \tag{9}$$

where $l_1$ and $l_2$ are the respective lengths of the fracture wings.

Other forms of resonance can take place in the wings 16A, B of the fracture 16. Referring to FIG. 1, a pressure antinode (peak) will develop at the mouth 18A, B, i.e., location of performations 18, of a wing 16A, B of the fracture 16 at the frequency at which its length 1 is exactly ½ wavelength. The fracture wing 16A,B acts like an organ pipe, closed at the far end. Being ½ wavelength long, the impedance of the fracture wing 16A,B at its mouth 18A,B is also closed, blocking flow pulsations at the perforations 18A,B. The same phenomenon occurs at all frequencies where the fracture length 1 is an integer multiple of ½ wavelength. If both wings 16A,B of the fracture 16 happen to have lengths which are integer multiples of a half wavelength at the same frequency, even if the multiple factors for each wing 16A,B are not the same, then the entire fracture 16 is closed and from the point of view of pressure pulsations, the bottom of the borehole 14 is closed and behaves as if there were no perforations. Such an event could be detected by the pressure sensors 30 and 34 of FIGS. 2 and 3 by observing a peaking or maximization of pressure pulsation as the pump stroke frequency is gradually varied. This type of peaking event is less likely to occur than a pulsation nulling event since a peaking event requires simultaneous antinodal resonance in both wings 16A,B of the fracture, whereas nulling requires nodal resonance in only one or the other wing 16A,B of the fracture. The set of peaking frequencies is therefore the intersection of the sets of antinodal frequencies of the two fracture wings 16A,B, according to $$
\begin{array}{lll}
& f_{10} = 0 & f_{20} = 0 \\
& f_{11} = c/2l_1 & f_{21} = c/2l_2 \\
\text{wing \#1} & f_{12} = c/l_1 \quad \text{and} & f_{22} = c/l_2 \quad \text{wing \#2,} \\
& f_{13} = 3c/2l_1 & f_{23} = 3c/2l_2 \\
& f_{14} = 2c/l_1 & f_{24} = 2c/l_2 \\
& \vdots & \vdots
\end{array}
\quad (10)
$$

If the lengths l of the two fracture wings 16A, B differ significantly, pressure pulsation amplitude peaks (antinodes) will be somewhat less commonly observed by the sensors 30 and 34 in FIGS. 2 and 3, whereas pressure pulsation nulls (nodes) will be observed frequently, as the pump 10 frequency is varied.

Another way of sensing downhole pressure pulsation to determine node and antinode frequencies is illustrated in FIG. 4. In this configuration the fracturing fluid 15 is pumped through tubing 40, suspended at the wellhead 20 inside casing 14. The outer diameter of the tubing 40 is smaller than the inner diameter of the well casing 40, so that an annular region 42 exists between the tubing and casing. Pressure sensor 44 senses the "wellhead pressure," the pressure inside the tubing 40, at the wellhead 20. Pressure sensor 46 senses the "annulus pressure," the pressure inside the annulus 14, at the wellhead 20. The length of the tubing 14, which is the length of the annulus, is d.

Observation of the pressure pulsations by sensor 46 is an indirect but sensitive way of observing the pressure pulsations at the bottom of the hole, at the mouth 18 of the fracture 16A,B. An expanded view of the hydraulic system is shown in FIG. 5. It is clear from this figure and from FIG. 4 that the pressure wave propagation path from the wellhead 20 (sensed by sensor 44) to the annulus (sensed by sensor 46) has a "choke point" at the bottom of the well, at the mouth 18A,B of the wings 16A,B of the fracture 16. It is clear that if either wing 16A,B of the fracture had a null resonance in accordance with Eq. (9), the boundary condition for pressure pulsations at the mouth 18A,B of the fracture 16 would be zero, with the result that there would be no driving function for the column of fluid leading up to sensor 46. The signal from this sensor 46 would therefore drop to zero at any of the resonant frequencies of the fracture 16 given by Eq. (9). In fact, this type of resonance has been observed in a 1,000-foot deep well located near Tulsa, Okla., that was fractured in October 1984.

Typical pressure pulsation signals from the Oklahoma well are shown in FIG. 6. A pressure sensor 48 sensed the pressure pulsations at the pump outlet, while sensor 44 sensed the pulsations at the wellhead, and sensor 46 sensed the pulsations at the annulus. These are periodic waveforms containing fundamental components and harmonic components. While pumping at constant speed, the fundamental and harmonic frequencies correspond exactly at the 3 pressure points. Fourier analysis of these pressure signals can be used to demonstrate fracture resonance.

FIG. 7 shows power spectra of the pressure pulsation signals at the pump outlet 12, at the wellhead 20 and at the annulus 42. Spectral peaks at the fundamental (first harmonic), second harmonic, third harmonic, and fourth harmonic frequencies are evident. The fundamental frequency is 4.85 Hz, indicating a pumping rate of 4.85 strokes per second. All four harmonics are seen and measured by appropriate tachometers at the pump 10 and at the wellhead 20. At the annulus 42, only the fundamental and third harmonic components are seen. The second and fourth harmonics have been tuned out.

Four seconds of data were used to obtain the spectra of FIG. 7. Just prior to the time segment of this data, the pump stroke rate was slightly slower than 4.85 strokes per second, and all four harmonic peaks were seen in the annulus signal spectrum. Just after the time segment of the data of FIG. 7, the pump speed was slightly higher than 4.85 strokes per second, and once again all four harmonic peaks were seen in the annulus signal. The tuning out of the second and fourth harmonics corresponds to the existence of nulls in the transfer function from wellhead to annulus at frequencies of $2 \times 4.85 = 9.7$ Hz and $4 \times 4.85 = 19.4$ Hz. These null resonances are amazingly sharp, indicating low frictional losses for the waves in the fracture. Many such nulls have been observed in the wellhead-to-annuls transfer function at a variety of frequencies.

Nulling also occurs in the wellhead pressure signal. It takes place when the boundary conditions of pressure and fluid particle velocity at the bottom of the borehole create a certain impedance loading on the bottom of the tubing 40 that causes a standing wave pattern in the tubing 40 having a pressure node at sensor 44. When this happens, the same conditions apply in the annulus 42, whose length d is the same as that of the tubing 40. So, when the wellhead pressure experiences a null, the annulus pressure also experiences a null which may not correspond to a resonance in the fracture. The remedy to this situation is to take the ratio of amplitudes of the corresponding harmonic pressure signals of the annulus and the wellhead. This gives a magnitude transfer function from wellhead pressure to annulus pressure, which is a function of frequency. Variations in the amplitude of the pressure signal at sensor 44 have been factored out. Nulls of this transfer function correspond to nodal resonances of the fracture in accord with Eq. (9).

This transfer function can also be used to detect antinodal resonances in the fracture 16, when both wings 16A,B of the fracture resonate at the same frequency, in accordance with Eq. (10). Then, mouths 18A,B of the fracture wings 16A,B are closed, as if the fracture 16 did not exist. At FIG. 5, the tubing 40 and annulus 42 behave like a straight piece of pipe and the pressure pulse amplitude is maximized in the annulus. The pressure sensor 46 is located at a closed end, at an antinodal pressure point in the annulus 42. The pressure pulses here could be substantially stronger than at sensor 44, so that the transfer function magnitude from the wellhead pressure to the annulus pressure could be greater than one, peaking at any frequency where both wings 16A,B of the fracture 16 have antinodal resonances.

Several methods of measuring transfer function have been developed. One method, based on a well-known statistical technique, is the following. The mean values of both wellhead and annulus pressure signals are first removed, leaving only the two pressure pulsation signals. The transfer function from wellhead to annulus is obtained as the ratio of the cross-spectrum of the wellhead pulsation signal with the annulus pulsation signal divided by the autospectrum of the wellhead pulsation signal. This method gives the transfer function as a complex function of frequency, from which one can obtain the magnitude of the transfer function and its phase. If one only needs the transfer function magnitude, this can be obtained alternatively as the square root of the ratio of the power spectrum of the annulus signal to the power spectrum of the wellhead signal. An excellent reference on the statistical measurement of transfer function and the theory behind this is the text by A. Papoulis, "Probability, Random Variables, and Stochastic Processes," 2d Ed., McGraw-Hill Book Co., 1984, incorporated herein by this reference.

Another method for measuring magnitude and phase of the various pump harmonic signals which can be used to find a transfer function is shown in FIG. 8. The method is based on adaptive filtering of the type discussed by Widrow, et al., "Adaptive Noise Cancelling: Principles and Applications," Proc. IEEE, Vol. 63, No. 12, pp. 1692-1716, Dec. 1975; Widrow and Stearns, "Adaptive Signal Processing," N.J.: Prentice-Hall, Inc. 1985; Widrow, U.S. Pat. No. 4,537,200, which are incorporated herein by reference.

An adaptive algorithm is used in FIG. 8 to create a sharply tuned filter whose response peak has unit gain, zero phase shift, at a frequency that exactly tracks a selected pump harmonic frequency. Given a pressure pulsation signal, this filter passes without distortion only the selected pump stroke harmonic, and blocks all other signal components. The filter works in the following way. A tachometer 50 attached to the pump 10 produces pulses at a rate precisely proportional to pump stroke rate. A phase-lock-loop 52 can be used to measure the tachometer pulse frequency. Other well-known means could also be used to measure tachometer frequency, such as measurement and averaging of pulse-to-pulse intervals. In any event, the measured tachometer frequency is multiplied 54 by the appropriate ratio equal to the product of the gear ratio between tachometer shaft and pump crankshaft, the number of cylinders of the pump, and the particular harmonic number of interest. The fundamental is harmonic 1, the second harmonic is harmonic 2, etc. Sine and cosine waves 56, 57 of unit magnitude are generated having the frequency of the tachometer multiplied by the frequency ratio above-mentioned. Their phases are fixed relative to a given crankshaft reference angle. These sine and cosine reference signals are variably weighted 60, 62, as illustrated in FIG. 8, then summed and substracted 66 from the pressure pulsation signal 68 to be analyzed in order to form an error signal 70. An adaptive algorithm 72 as described in the above references automatically adjusts the weighting coefficients or weights to minimize the mean square of the error signal, thereby generating a weighted, summed output signal 74,76 that is a best-least squares match to the input signal to be analyzed. As the above referenced teach, the output signal is equivalent to the input signal having gone through a tuned filter, tuned to the frequency of the sine and cosine signals. This frequency will be that of a selected pump harmonic.

The magnitude and phase of the selected harmonic contained in the input signal to be analyzed can readily be obtained from the values of the adaptive weights, as in FIG. 8. Since the weighted output is a best-least squares match to the selected harmonic component of the input signal, and since the sine and cosine reference signals are each of unit amplitude, the magnitude of the selected harmonic component is equal to the square root of the sum of the squares of the two weight values. The phase lag of the selected component is the arc tan of the ratio of sine signal weight to cosine weight, all relative to the cosine signal which is defined t have zero phase.

Other methods than the adaptive technique can be used to find magnitude and phase of selected harmonic components of input signals. Generating sine and cosine signals as in FIG. 8, they can be cross-correlated with no lag with the input signal. The cross-correlation values, when multiplied by a factor of 2, will correspond to respective sine and cosine weights of the adaptive process.

Other methods than the adaptive technique could be used to create a filter tuned to the selected harmonic frequency. The parameters of a tuned digital filter of conventional design could be set automatically to resonate at the frequency of the selected harmonic at all times. The correlation method described above can be used in conjunction with either adaptive or conventional tuned filtering. However, the preferred method of tuned filtering and estimation of magnitude and phase of the selected pump harmonic is shown in FIG. 8.

Values of transfer function from the wellhead 20 to the annulus 42 can be obtained by simultaneously estimating the magnitude of a selected harmonic in the annulus pressure and the magnitude of the same selected harmonic in the wellhead pressure and taking the ratio of the magnitudes. This can be repeated for all observable harmonics to give a number of points on the transfer function curve. By sweeping the pump stroke frequency over time, the entire process can be repeated many times to yield transfer function values at many different frequencies. This was done for the Oklahoma well, and the result is shown in FIG. 9.

Referring to FIG. 9, one can discern an average null spacing to be 1.006 Hz from Eq. (8), the null spacing is $$f_2 - f_1 = \frac{c}{2l} \tag{11}$$

Therefore, $$l = \frac{c}{2(f_2 - f_1)} = \frac{c}{2(1.06)} \tag{12}$$

A theory exists for the velocity of acoustic waves in fluid filled cracks, developed by B. Chouet of the United States Geological Survey, whose work is referenced below and is incorporated herein by this reference. From the known properties of the fluid and the surrounding rock, a velocity of c=500 ft. per second has been established. Accordingly, we estimate the length of one wing of the Oklahoma fracture to be $$l = \frac{c}{2(f_2 - f_1)} = \frac{500}{2(1.06)} = 236 \text{ feet} \tag{12}$$

By varying the pump speed throughout the fracturing process, one can obtain transfer function data from which the length of the fracture can be estimated at various stages of the process. In this manner, the growth of the fracture has been observed.

In most cases, the transfer function nulls are not uniformly spaced as they are to good approximation in FIG. 9. Nulls that are not uniformly spaced indicate that the two wings 16A,B of the fracture 16 are somewhat asymmetrical. The transfer function shows nulls corresponding to nodal frequencies for both fracture wings 16A,B. An example is shown in FIG. 10. Analysis of this transfer function reveals that the null spacing for one wing of the fracture 15 is 1.08 Hz, and for the other is 1.15 Hz. With a wave velocity of c=500 ft/sec. once again, the lengths of the wings of the fracture are $$l1 = \frac{c}{2(1.08)} = \frac{500}{2.16} = 231 \text{ feet}$$

$$l2 = \frac{c}{2(1.15)} = \frac{500}{2.30} = 217 \text{ feet}$$

Referring to FIGS. 2-3, it should be realized that frequencies corresponding to either pressure null or antinulls can be determined by using the above described means for measuring the amplitude of a selected pump harmonic in a pressure sensor signal or in a geophone signal down in the bottom of the wellbore. The pump stroke frequency generally needs to be swept over time while maxima and minima of pressure pulsation amplitudes are noted for the various harmonic frequencies.

In most cases, more than one pump 10 is pumping a fracture at any given time. All pumps 10 should be equipped with tachometers, so that the various harmonic components due to each pump can be tracked and measured exactly as illustrated in FIG. 8. If all the pumps 10 run at different stroke rates and these stroke rates are varied, a great opportunity is created for gathering manyfold more frequency points on resonance curves and transfer function curves within a given length of time.

The technique illustrated in FIG. 4 involving pumping through tubing and sensing the downhole pressure pulsations by means of an annulus which is open from bottom to top is a very sensitive method for detecting nodal and antinodal resonant frequencies of the fracture which are of crucial interest in determining fracture geometry.

Pumping through tubing is common when pumping deep holes at high pressure. The objective is to prevent high pressure fluid from contacting the wellhead at shallow depths. A packer 80 is normally used to plug the annulus, as shown in FIG. 11A, to prevent the application of high pressure to the wellhead. With the packer 80 in place, however, the annulus pressure at the surface is not representative of downhole pressure at the mouth 18 of the fracture 16. In order to sense downhole pressure pulsations, a very sturdy small-bore tubing 90 is inserted into the tubing 40 carrying the high-pressure fracturing fluid. The pressure transducer 44 senses the wellhead pressure, while the pressure transducer 91 senses the inner tubing pressure. At the wellhead 20, the inner tubing emerges through a seal 92 in the tubing itself. Since the length of the inner tubing 90 is the same as that of the tubing 40 and the same as that of the annulus 42 in FIG. 4, the magnitude and phase of the pressure pulsations at sensor 91 in FIG. 11 will be the same as the sensor 44 in FIG. 4. Thus, the transfer function from the pressure pulsation signal at sensor 44 to the pressure pulsation signal at sensor 91 of FIG. 11 can be used to directly substitute for the corresponding transfer function of FIG. 4 in detecting resonant frequencies of the fracture wings 16A,B.

In an alternative approach of FIG. 11B, the fluid from the pump 10 goes down the wellbore through the open annulus 42 and is then pushed out through the openings or perforations 18a, 18b into the fracture 16a, 16b. The tubing 40 is provided to couple a means for sensing downhole pressure to the bottom of the borehole 40. The pressure sensor 91 is provided on top of the tubing 93 to sense the downhold pressure.

In a further alternative embodiment in FIG. 11C, the fluid is again pumped through the annulus 42 and into the fracture 16 through fracture mouth openings 18. In this embodiment, the sensor 91 is lowered through tubing 40 to a point adjacent to the fracture mouth openings 18A,B with signal return being through a wireline 95 to the surface signal detector P2. The top of the tubing 40 is sealed to maintain accuracy of the pressure readings being taken at the bottom. The tubing 40 is provided to protect the sensor 91 from the fluid being pumped which, in fact, carries a mixture of gel and sand, and would be quite damaging to the sensor if it were exposed to the pumped fluid coming down the annulus 42.

The data realized in any of the above embodiments can be analyzed using the method of this invention by taking the Fourier transform of the transfer function.

The embodiment of FIG. 11B was the subject of extensive testing, with the results being shown in FIGS. 12A-D. Referring to FIG. 11B which shows the physical setup of the test well, the purpose of the tubing 40 in the borehole 14 was to sense pressure at the bottom of the hole, close to the mount 18 of the fracture. Pressure sensors 44, 91 were attached to the wellhead to sense annulus pressure at the surface (P1), and to the top of the tubing P2 (otherwise sealed off). During the pumping process, these pressure signals were recorded as were tachometer signals from all the pumps. This data is subsequently used to determine fracture length vs. time.

The methodology works in the following way. Each pump piston stroke at pumps 10 causes a pressure pulse to occur at the pump's outlet. An aggregation of pumps 10 simultaneously pumping, preferably with the pumps being separately swept through a band of frequencies, causes a complicated pattern of pressure pulses to be applied to the pump discharge line 12. This gives rise to a pumping signal, detected by the annulus pressure sensor, having a wide bandwidth character. Frequency components up to 40 Hz are common. The pressure pulses travel as acoustic waves in the discharge line 12. These waves travel down the annulus 42, through the perforation holes 18, and out into the wings 16A,B of the fracture 16. The waves in the fracture wings 16 reflect from irregularities and from the ends of the fracture wings 16A, B to create echoes, which re-enter the borehole through the perforation holes 18. Again in the borehole, these waves travel up the annulus 42 and up the tubing 40, allowing their detection by the tubing pressure sensor P2, 91. Noting the arrival times of the various reflections, the interpreter is able to identify the reflections in the fracture and distinguish them from reflections in the borehole. With knowledge of acoustic speed in the borehole and in the fracture 16, the arrival times can be used to calculate the length of the fracture 16.

The key to finding reflection information is the transfer function between the pressure signal at the annulus measured by sensor P1, 44 and the pressure signal at the top of the tubing measured by sensor P2, 91. (The inverse transfer function could also be used, using the equipment setup shown in FIG. 4.) The transfer function for analysis of data derived from FIG. 11B is a complex function of frequency. It is the ratio of the signal component at frequency $\omega$ radians/sec. in the tubing pressure measured at P2, 91 to that in the annulus pressure measured at P1, 44. Instantaneous pump frequencies obtained from the tachometer signals are used in the calculation of this transfer function. Adaptive filters (described with reference to FIG. 8) tuned to the pump frequencies are used to extract corresponding signal components from both the annulus and the tubing pressures signals detected at P1, P2 using a modified version of the circuit of FIG. 8 wherein the pressure transducer 68 is replaced by the output of tachometer 91.

Resonant phenomena in the borehole and in the fracture wings 16A,B can be observed from the transfer function. However, it is easier to distinguish borehole and fracture acoustic phenomena by plotting the transfer function in the time domain, i.e., by Fourier transformation before plotting. As such, one sees the impulse response from the top of the annulus to the top of the tubing. The impulse response can be physically interpreted in the following way. Imagine that the pumps 10 stimulate the well so that the annulus pressures sensor P1, 44 detects a unit pressure pulse at time zero. The response at all time thereafter of the pressure sensor P2, 91 on the tubing 40 is defined as the impulse response from the annulus 42 to the tubing 40. Although the impulse response is obtained from the transfer function which in turn is obtained statistically from the pumping data, this impulse response is the same as if an explosion took place inside the pipe 12 at the top 20 of the annulus, and the impulse response were obtained from the resulting tubing pressure signal. Using natural pumping data however, the impulse response is obtained non-invasively all throughout the pumping process, without setting off explosions in the pipeline. So, making use of the impulse response, the length of the fracture 16 can be measured during the entire pumping schedule.

Wave propagation in the annulus, the fracture wings, and in the tubing has been analyzed by drawing an analogous set of coupled electrical transmission lines. Reflection coefficients and transmission coefficients are related to ratios of annulus, tubing, and fracture cross-sectional areas.

FIG. 12 shows an impulse response plot averaged over four minutes of data taken after 32 minutes of pumping. An interpretation of the plot is the following.

Referring to FIG. 12A, imagine a pressure pulse occurring inside the annulus 42 at time zero at the top 20 of the annulus. A pressure wave would travel down the annulus 42. This wave would travel past the bottom of the tubing 42, which ends at a point just above or adjacent to the openings 18 and would initiate a wave traveling up the tubing 40 which would subsequently be detected by the pressure sensor P2, 91 at the top of the tubing 40. In FIG. 2, this arrival corresponds exactly to pulse A. The arrival time and polarity are correct.

The original wave traveling down the annulus goes beyond the bottom of the tubing 40, and as it engages the perforation holes 18, reflects from these holes and at the same time excites the fracture 16. The reflection from the perforation holes 18 travels upward, excites an upward going wave in the tubing 40 and is subsequently detected at the top of the tubing. This wave corresponds exactly to pulse B in FIG. 12. It arrives later than pulse A by the two-way acoustic travel time from the bottom of the tubing to the top of the perforation zone. The polarity and arrival time are correct.

When the original downward wave arrived at the perforation zone, it triggered a wave that traveled in the fracture 16 and reflected from its internal irregularities and discontinuities. Negative or positive polarities are possible for these reflections, and their amplitudes depend on the nature of the discontinuities. Their arrival times beyond that of pulse B corresponded to two-way travel times for acoustic waves in the fracture propagating from the borehole out to the respective discontinuities. Since each time division corresponds to 0.5 sec., the two-way travel time to the event causing pulse C of FIG. 12B id 0.114 sec and the two-way travel time to the event causing pulse D is 0.227 sec.

In a recent paper, B. Chouet describes acoustic wave motion in a fluid-filled crack in the earth (B. Chouet, "Dynamics of a fluid-driven crack in three dimensions by the finite difference method," *Journal of Geophysical Research*, Vol. 91. no. B14, pp. 13,967–13,992; 12/10/86).

In this paper, he develops expressions for the acoustic velocity in the crack. Accordingly, an approximate velocity in the fracture is obtained as 1/10 the velocity in the borehole, or 5000 ft./sec. This gives a velocity figure for the fracture of about 500 ft./sec. Therefore, the event that caused pulse C was located 28.5 feet from the borehole, and the event that caused pulse D was located 57 feet from the borehole.

Further inspection of FIG. 12A shows pulses A', B', C' and D'. These are multiples of pulses A, B, C and D. Theory predicts polarity reversal, and the data bears this out. Recall that the data of FIG. 12A was taken after 32 minutes of pumping. FIG. 12B was taken from this minifracture after 82 minutes of pumping. New events can be seen in FIG. 12B, pulses E and F, which correspond to reflections which took place about 136 feet from the borehole. Thus, at the time of FIG. 12A, the fracture was at least 57 feet long, and at the time of FIG. 12B, the fracture had grown to be at least 136 feet long.

After stopping pumping for a period of several days, further pumping of the fracture further increased the fracture length. FIG. 12C shows impulse response data taken after about 18 minutes of pumping into stage 2 of the fracture. Many reflection events are seen after pulse B. The most distant significant pulse is pulse N, corresponding to a reflection event at a distance of 415 feet from the borehole.

The fracture was thus at least 415 feet long at 19 minutes into stage 2. At this time, maximum length was attained. After 36 minutes of pumping into stage 2, however, signs of the length decreasing appear in the data. The length continues to decrease at 40 minutes into stage 2. The length gradually decreases, then it stabilizes.

FIG. 12D shows impulse response data taken 78 minutes after the beginning of stage 2, 6 minutes into stage 4. One pound sand was being pumped at this time. The most distant significant event is pulse I, a reflection located about 250 feet from the borehole. Therefore, at this time the length was at least 250 feet.

From this preliminary evaluation, our present conclusion is that the length of the fracture increased during the first stage and increased further during the second stage and, after 36 minutes of pumping into stage 2 of the fracture, it gradually reduced in length and finally stabilized. The original plan was to pump for a total of five hours. The schedule was terminated prematurely (after three hours) as other means, based on pressure observations, indicated that the fracturing process had gone awry. It is probable that after 36 minutes the fracture started to collapse, the pumping forcing fluid upward into shallower layers of the earth rather than into the reservoir. Under real time data processing conditions, a signal to stop further pumping could have immediately been generated, much earlier than in fact happened. A highly desirable method of detecting when the size of a fracture has been maximized has thus also been developed.

Alternative embodiments of this invention may be apparent to a person of skill in this art. For example, the downhole pressure pulsations may also be sensed by using a geophone or accelerometer 34 on a wireline 36 as shown in FIG. 3. The geophone or accelerometer 34 can be cemented in at the hole bottom, submerged in cement 38 but close to the cement surface. The cement surface could be at the depth of the lowest perforation. The pressure pulsations in the fluid force oscillating vertical motions in the cement 38 which activate the geophone or accelerometer 34 causing it to produce an output voltage. The cementing process takes time to effect, but prevents the geophone or accelerometer 34 from moving in the hole during pumping. Other modifications may also become apparent to a person of skill in the art. Therefore, the scope of this invention is limited only by the following claims.

What is claimed:

1. A method of determining the geometry or dimensions of a fracture comprising the steps of
   defining a wellbore at least down to and intersecting the fracture,
   inserting a well casing pipe in said wellbore, said pipe being open to said fracture and holding a fluid,
   coupling a pump having a controllable operating speed to said pipe,
   sweeping said operating speed of said pump through a known band of frequency to cause acoustic waves to travel from the pump through the fluid into the fracture,
   locating at least one sensor in the vicinity of said fracture responsive to incident waves from said pumping step and reflected waves created by reflections from said fracture,
   calculating the dimensions of said fracture from data generated by said sensors in response to said waves by analyzing resonances established by superposition of incident and reflected waves causing standing waves.

2. A method as in claim 1 comprising the step of analyzing the resonant frequencies to determine the length of a wing of the fracture based on the relationships $f_1 = c/4l, f_2 = 3c/4l, f_3 = 5c/4l \ldots$ where $f_1, f_2, f_3$, are the fundamental resonant frequency of the fracture wing, c, is the velocity of propagation of an acoustic wave in the fracture.

3. A method as in claim 2 comprising the step of supporting a wireline pressure sensor in said wellbore at the opening to the fracture responsive to the amplitude of the pumping signal, frequencies $f_1, f_2, f_3, \ldots$ being defined by minimums in the amplitude of the fundamental pumping signal detected by said sensor.

4. A method as in claim 2 wherein the step of locating a sensor in the vicinity of said wellbore comprises the step of fixing a geophone in cement at the bottom of the wellbore, submerged in cement but close to the surface of said cement, pressure pulsations in the fluid forcing oscillating vertical motions in the cement conveyed to the geophone.

5. A method as in claim 2 including the step of detecting pressure null responses as indicating the lengths of the wings of the fracture, and pressure peaks as indicating simultaneous antinodal resonance in both wings of a fracture.

6. A method as in claim 1 including the step of inserting tubing down said wellbore to define an annulus between said tubing and said wellbore,
   locating a first transducer at said wellhead to track the pressure in said tubing at said wellhead,
   locating a second transducer in said annulus at the wellhead to track the pressure in said annulus,
   monitoring the pressure pulsations at said second transducer, the instant wherein said pulsations drop to zero representing a resonant frequency of the fracture.

7. A method as in claim 6 including the step of locating a third transducer at a truck pumping fluid down said pipe,
   monitoring the pressure pulsations at each of said three transducers,
   taking the Fourier transform of the output of said three transducers, said second transducer output having nulls at the resonant frequency of the fracture.

8. A method as in claim 6 including the step of inserting a second small bore inner tubing into said annulus-defining tubing in said wellbore,
   inserting packing into said annulus above said fracture opening, and
   coupling said second pressure transducer to said inner tubing to monitor pressure fluctuations representing pressure changes in the annulus.

9. A method as in claim 1 including the step of determining a transfer function for estimating frequency and magnitude of the signal return at the bottom of the wellbore comprising the steps of
   simultaneously estimating magnitude and phase of a selected harmonic in annulus pressure and wellhead pressure,
   taking the ratio of the magnitudes to develop a transfer function,
   repeating for a plurality of observable harmonics, and plotting a transfer function curve from the result of these calculations.

10. A method as in claim 9 including the step of repeating the ratio developing step for all observable harmonics of the pump output frequency.

11. A method as in claim 9 including the step of sweeping said pump output frequency with time, recording said magnitude and phase signals of selected harmonics, and calculating and plotting transfer functions values at different frequencies.

12. A method as in claim 11 wherein the length of the fracture can be defined as $l = c/2(f_2 - f_1)$ wherein $f_2-f_1$ represents the average spacing between nulls in magnitude of said transfer function, and c is the velocity of a propagating wave through rock surrounding said borehole.

13. A method as in claim 11 including the step of pumping said fracture with a plurality of pumps, the pumping rates of said pumps being varied in complementary ways to maintain a constant flow rate in said wellbore.

14. A method of determining the geometry or dimensions of a fracture comprising the steps of
defining a wellbore at least down to and intersecting the fracture,
inserting a well casing pipe in said wellbore, said pipe being open to said fracture,
inserting tubing within said well casing to define an annulus therein having a mouth at the surface,
coupling a pump having a controllable operating speed to said pipe, and pumping fluid down said pump so that said fluid flows out into said fracture,
changing said operating speed of said pump through a known band of frequency so that pressure waves created by said pump flow into said fracture reflect from the walls of said fracture and return up said tubing,
locating a first sensor at the mount of said annulus to sense said annulus pressure at the surface and a second sensor at the top of the tubing to detect reflections of the pressure waves from the features of the fracture,
calculating the dimensions of said fracture from data generated by said sensors in response to said waves by analyzing the impulse response from the top of the annulus to the top of the tubing established by comparison of said pressure waves created by said pump flow into said fracture with reflections of the pressure waves from the features of the fracture.

15. A method as in claim 14 wherein said tubing extends down the borehole to a point adjacent to the portion of the pipe open to the fracture.

16. A method as in claim 15 wherein a plurality of pumps operating at different frequencies are used to pump fluid down said borehole.

17. A method as in claim 16 including the step of sweeping each of said pumps randomly over a plurality of frequencies to provide a complex signal return from features in said fracture.

18. A method as in claim 14 including the steps of recording the pressure waves at the top of the annulus and the reflected waves at the top of the tubing, and calculating the transfer function between the pressure signal at the annulus and the pressure signal at the top of the tubing as the ratio of the signal component at frequency $\omega$ radians/sec. in the tubing pressure to that in the annulus pressure.

19. A method as in claim 18 including the step of calculating the transfer function in the time domain by the step of taking the Fourier transform of the transfer function.

20. A method of determining the dimensions and/or the geometrical shape of a subterranean fracture which is created by pumping a fluid through a wellbore into a subsurface geologic formation by observing and analyzing resonances of pressure oscillations in the fluid being pumped into the fracture, comprising the steps of
varying the speed of a pump connected to the wellbore to generate a series of oscillating pressure waves or pulses through a known band of frequencies that cover the range which will cause resonances in the fracture,
monitoring one or more pressure or acoustic sensors installed in the well casing of the wellbore that conveys the fluid to the fracture to measure the pressure wave signal created by the pump and reflected by the fracture and other fluid system components,
analyzing the data obtained from the sensors with mathematical methods that superimpose and transform the incident and reflected pressure pulse data in such a way as to identify resonances in the fracture from which the dimensions of said fracture can be deduced.

* * * * *

UNITED STATES PATENT AND TRADEMARK OFFICE
CERTIFICATE OF CORRECTION

PATENT NO. : 4,858,130
DATED : August 15, 1989
INVENTOR(S) : Bernard Widrow

It is certified that error appears in the above-identified patent and that said Letters Patent is hereby corrected as shown below:

> Title page after "Assignee:" Delete "The Board of Trustees of the Leland Stanford Junior University, Stanford, California" and insert --Gas Research Institute, Chicago, Illinois--.

Signed and Sealed this

Fourteenth Day of August, 1990

*Attest:*

HARRY F. MANBECK, JR.

*Attesting Officer*  *Commissioner of Patents and Trademarks*